United States Patent [19]
Fowlkes

[11] 3,743,091
[45] July 3, 1973

[54] SCREW SORTING MACHINE
[75] Inventor: Robert E. Fowlkes, Wytheville, Va.
[73] Assignee: Fowlkes Machine Company, Wytheville, Va.
[22] Filed: June 24, 1971
[21] Appl. No.: 156,196

[52] U.S. Cl............. 209/73, 209/74, 209/82, 209/88
[51] Int. Cl. ............................. B07c 3/10
[58] Field of Search ............. 209/90, 73, 80, 74, 209/75, 82, 88; 33/199

[56] References Cited
UNITED STATES PATENTS

| | | | |
|---|---|---|---|
| 2,984,350 | 5/1961 | Gerald | 209/90 |
| 3,502,208 | 3/1970 | Muller | 209/73 |
| 2,355,311 | 8/1944 | Linkner | 209/90 |
| 2,803,342 | 8/1957 | Gates | 209/74 |
| 2,111,252 | 3/1938 | Summers | 209/82 |
| 2,133,061 | 10/1938 | Strayer | 209/82 |

Primary Examiner—Allen N. Knowles
Assistant Examiner—Gene A. Church
Attorney—Allan M. Lowe and J. Ralph King

[57] ABSTRACT

An apparatus and method for automatically sorting screws, bolts or like parts by sensing the contour of the part and directing the same to appropriate collection points is provided. Oscillating kicker fingers urge each screw, or other part, from a gauging station past a gauge head having a thread or other contour matching the part being sorted. The kicker fingers move substantially laterally of the feed path and project the parts into corresponding first and second receiving means. When the first gauge head does not allow passage of the part and thereby a no-go condition exists, then the part is tested or gauged against the second gauge head. The screw is agitated and lifted against an overhead guide rail for encouraging contour alignment and accurate positioning. Each part is gated from the feed conveyor to the gauging station in an automatic fashion by the kicker fingers. Screws or parts not matching either gauge head may in an alternative embodiment be removed from the gauging station along a separate path for further processing. The kicker fingers are interconnected by a spring to provide a resilient characteristic to the urging force to prevent damage to the part or the gauge head. The cooperating gauge heads include a positioning slot that forms the gauging station and each head may be used in any one of four alternate positions.

20 Claims, 10 Drawing Figures

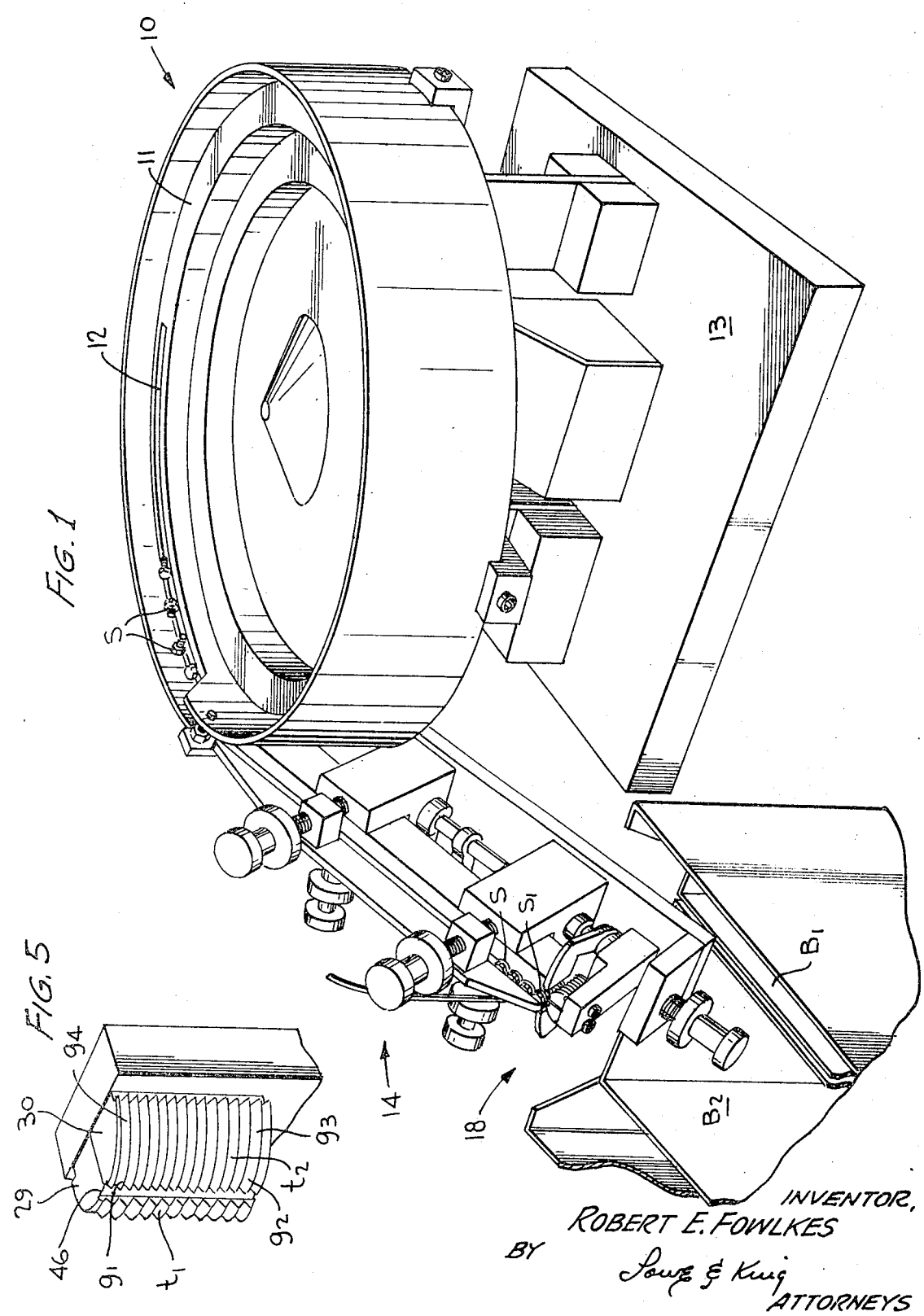

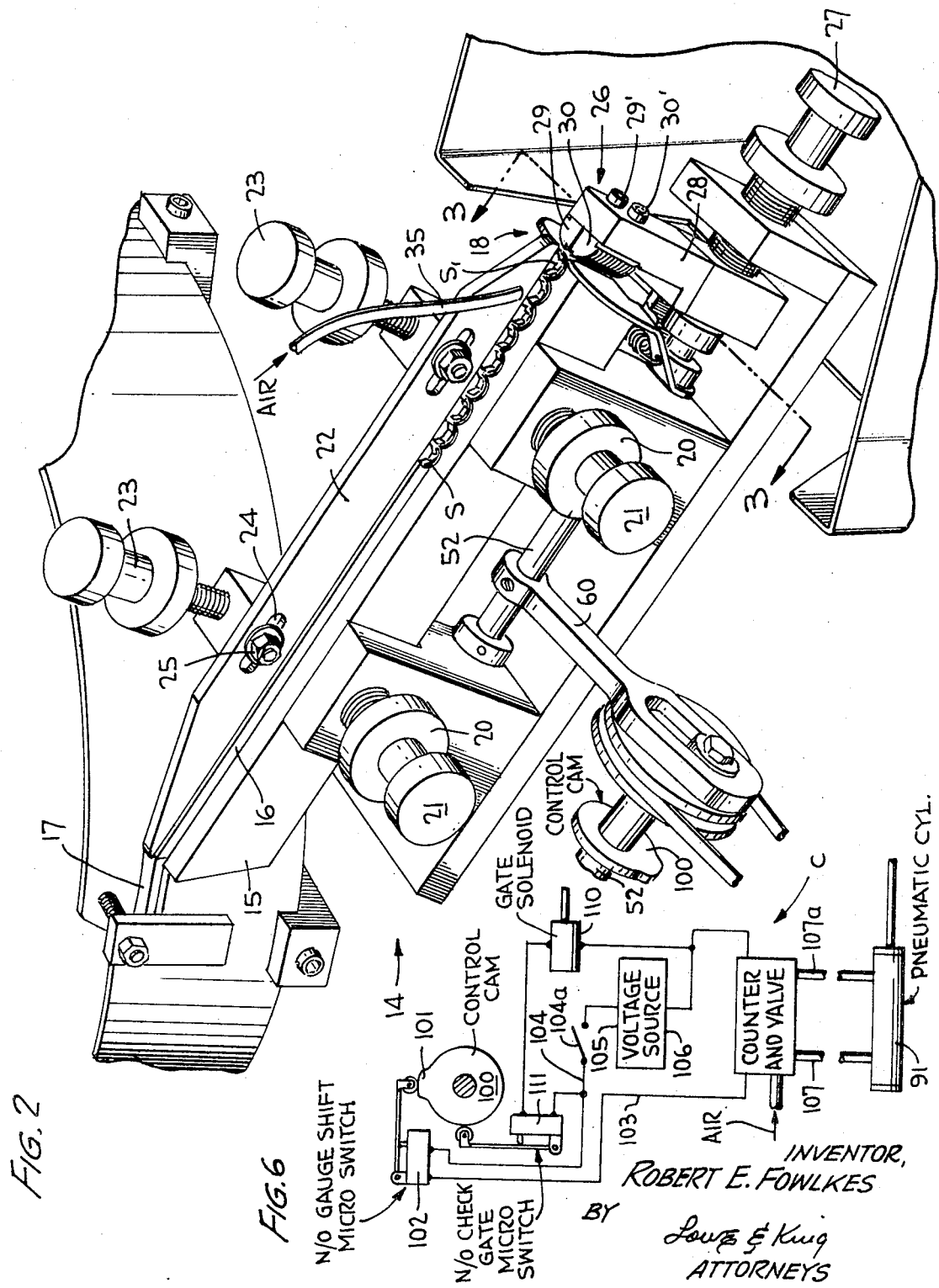

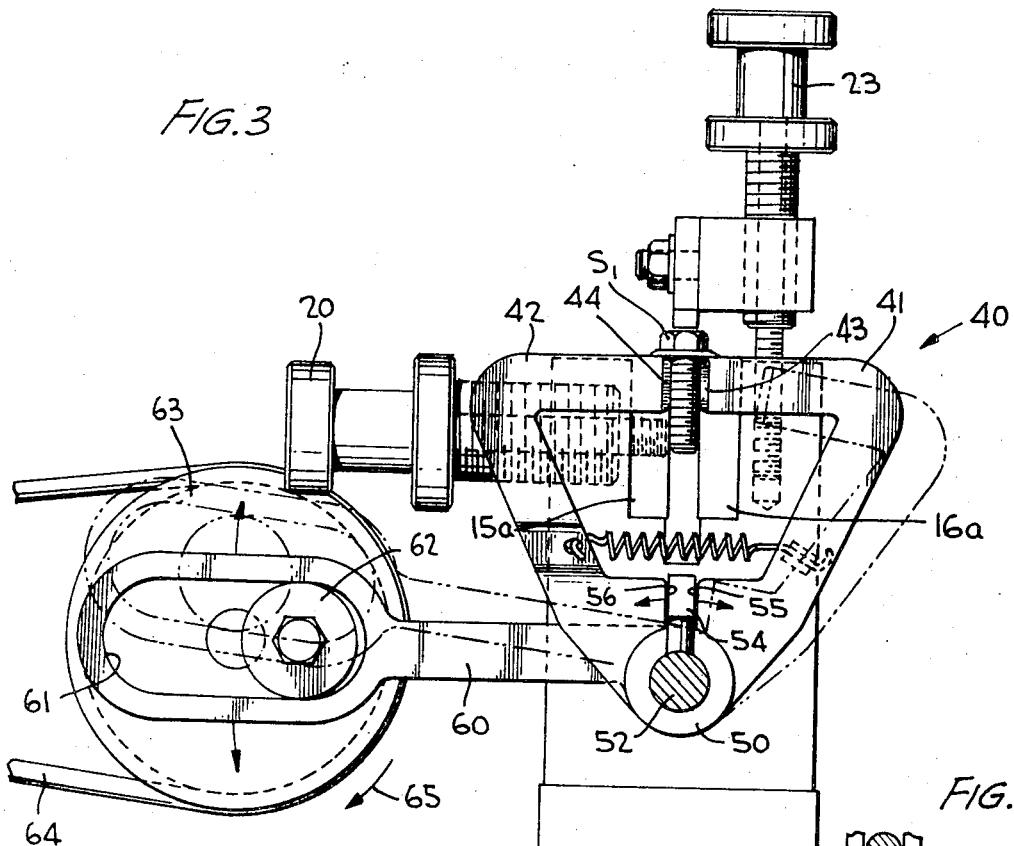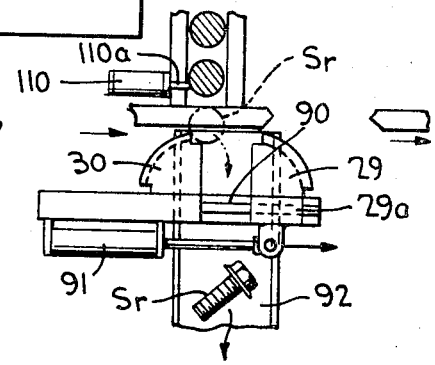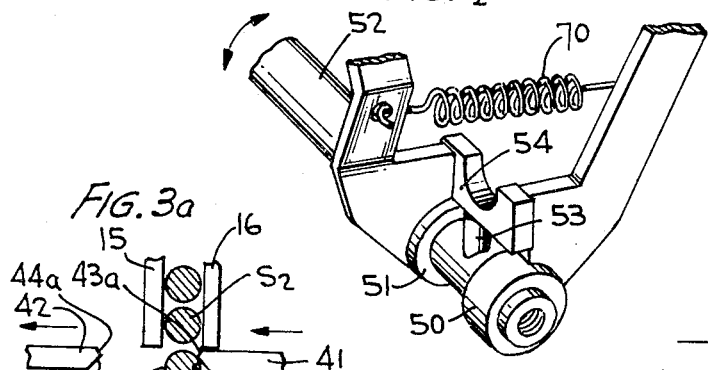

SCREW SORTING MACHINE

The present invention relates to the broad art of automatically assorting parts, and more particularly, to an apparatus and method for sorting screws or the like by moving the same into engagement with and past corresponding gauge heads.

BACKGROUND OF THE INVENTION

It has long been known to separate or sort small parts, such as rivets, screws, gears and the like in an automatic fashion by use of machinery. However, insofar as I am aware, such prior sorting operations have been, at least in the case of rivets and screws limited to a gauging of the body diameter or head size, and in the case of gears and the like, limited to determination of whether or not there has been proper machining of the part to give accurate size parts across the diameter, for example. The development of such prior art machines has spanned a large number of years and typical machines to perform these functions are shown by the patents to Linkner, U.S. Pat. No. 2,355,311 issued Aug. 8, 1944 and Muller, U.S. Pat. No. 3,502,208 issued Mar. 24, 1970.

However, with all of the work that has been done in this area, to my knowledge no successful machine has been made to bring further refinement to these sorting operations, such as would allow in addition to size and/or variation in radius of a part, the detection and automatic separation or sorting as to the distinctive contour of the part. Thus, heretofore after such parts as screws have been initially separated as to body diameter, head size, and perhaps length, the final separation as to the pitch of the thread had to be made by a tedious and painstaking visual inspection. In many cases, the pitch of the threads is so close, such as between 10 and 14 pitch thread (ten or fourteen threads per inch), that the task was well nigh impossible to perform with an acceptable degree of accuracy. Even if the task could be performed accurately by visual inspection, the cost of employing personnel to perform the separating process has been prohibitive. Prior to the present invention, parts had simply been destroyed, or recycled through expensive machining operations where possible, when the parts became mixed.

Thus, there has been a long felt need in the art for a machine that would automatically separate distinctive parts, such as screws with two or more different threads. The problem of mixed parts starts as early as in the manufacturing process where the output of two or more different machining operations, such as performed by screw machines, can be inadvertently mixed. This most often happens when the personnel of the machine shop is combining the outputs of two or more screw machines for shipment to a customer and a batch of a similar, but nonetheless different threads is included. When such inadvertent mixing takes place, substantially the entire output from all of the machines is wasted. Also, in many manufacturing operations, inadvertent mixing of screws with different pitch threads can occur by the personnel on the assembly line or others. Furthermore, many screws are dropped during a manufacturing operation that could be saved from the clean-up of the area, if an automatic machine was available to provide relief from high cost and inaccurate manual labor for visual inspection.

OBJECTIVES OF THE INVENTION

Accordingly, it is one object of the present invention to provide a screw or other part assorting method an apparatus that automatically distinguishes between the distinctive outer contour of a part, such as the thread, and places the part in appropriate receptacles to permit subsequent use.

It is still another and more specific object to provide an automatic screw sorting machine wherein the screws are fed down a feed conveyor and then laterally kicked past one or another gauge head that acts as a go/no-go gauge for the threads.

BRIEF DESCRIPTION OF THE PREFERRED EMBODIMENT

Manufactured parts, and particularly small parts such as screws, are separated or sorted in accordance with the invention by presenting the same in seriatim at a separating station and alternately moving the parts past at least two gauge heads serving as a go/no-go gauges. If the thread of the screw matches with the contour of the first gauge head, then the screw will be ejected by the kicker to a first receiving bin. If there is a no-go condition (no match) at the first gauge head, then the part is redirected and urged for movement past a second gauge head whereby the part is deposited in a second receiving bin.

The kicker assembly forming the means for urging the parts past the gauge heads comprises opposed kicker fingers connected by a spring. An oscillating shaft moves one finger in a first direction with the spring causing the second finger to trail along behind and pass through the gauging station. With a screw positioned at the gauging station maching the contour of the first gauge head, said screw is deposited in an appropriate fashion in the first receiving bin by the trailing finger. If there is a no-go condition at the first gauge head, the resiliency of the spring prevents damage to the screw threads or the gauge head and the screw is merely held at the central gauging station. Upon movement of the kicker assembly in the opposite direction, the first kicker finger is now the trailing and resiliently urged finger and serves to push the screw past the matching second gauge head and into the second receiving bin. In the event that neither gauge head corresponds to the threads of the screw being tested, the screw may, in accordance with one embodiment of the invention, be removed from the gauging station along a separate path so that the sorting operation may continue unimpeded.

The gauge heads are formed of quarter cylinders, that is with quarter sectors at each end of the head with the thread-like contour surface extending along the outer periphery of each quarter cylinder. In this manner, each gauge head has four gauging areas that may be used as each area experiences wear by the engagement with the screws being sorted.

The feed conveyor for seriatim presentation of the parts to the gauging station may be an inclined parallel guide rail arrangement wherein the head of the screw serves as the support. A center, overhead guide rail maintains the screws along the feed path and the end of the upper guide rail adjacent the gauging station serves as a limit for upward movement of each screw as it is tested. A slight upward movement is desirable to assure the slight agitation and resilient support of the screw that permits easier mating of the parts with the gauge heads. Preferably, the lifter is in the form of an airstream that engages under the head and lifts the screw. With the use of an airstream, the bolt literally floats and vibrates on a cushion of air so that any slight axial movement of the bolt is readily accommodated and alignment of the threads is facilitated. The airstream also assists in forward feeding of the screw to move between the kicker fingers into the positioning slot and holding the same snugly against the gauge heads during the gauging operation.

The operative ends of the kicker fingers include double chamfers to form (1) an oblique drive surface to push each screw being gauged forwardly into snug engagement with the gauge head and thusly into the appropriate receiving bin, and (2) a rearwardly directed chamfer for separating the next screw in line from the screw being tested. A central positioning slot between the gauge heads delineates the gauging station and is the same depth as the depth of threads on the screws so as to further facilitate a proper engagement of the part with the gauge heads. The forwardly facing ends of the guide rails act as a stationary backup for the kicker fingers so that the chamfered feed surface cannot slip behind the screw and not perform its urging or pushing function.

In an alternative embodiment, there may be included means for releasing the screw from the gauging station in the event that neither gauge head matches therewith. This additional structure may take the form of means for separating the gauge heads at the gauging station to permit the screw tested and not matched to fall below along a path separate from the ejection paths to the two main receiving bins. The backs of the kicker fingers primarily serve to gate the screws to the gauging station; however, a solenoid gate may be provided in this alternative embodiment to assure proper gating of the screws into the gauging station only after a complete cycle. In the event that it is known that only screws having the different threads corresponding to the gauge heads provided, the screw ejector system is not required, and if present, may be disabled.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 1 is an overall perspective view illustrating the preferred embodiment of the apparatus of the present invention coupled with a conventional vibratory feeding bowl;

FIG. 2 is an enlarged perspective view from the opposite side of that shown in FIG. 1 also showing the sorting apparatus constructed in accordance with the preferred embodiment;

FIG. 3 is a cross-sectional view taken along line 3—3 of FIG. 2 and illustrating the kicker assembly and drive means;

FIGS. 3a –3c illustrate sequential operation of the kicker fingers through the gauging station and sorting of screws;

FIG. 3d illustrates a fourth step in a sorting or gauging cycle and an alternative embodiment of the sorting apparatus that may be utilized;

FIG. 4 is an enlarged detailed perspective view of the kicker assembly;

FIG. 5 is an enlarged perspective view of the side-by-side gauge heads; and

FIG. 6 is a schematic diagram showing a control circuit for use with the alternative embodiment of the apparatus wherein release of screws not mating with either gauge head may be effected.

DETAILED DESCRIPTION OF THE PREFERRED EMBODIMENT

With reference now to FIGS. 1 and 2, a more complete analysis of the features and functioning of the automatic screw sorting system of the present invention may be described. A typical vibratory feeding bowl 10 with helical feeding ramp 11 and orientating slot 12 for bolts or screws S may be provided on a base 13 for providing a seriatim input of screws to sorting apparatus 14, constructed in accordance with the present invention. At the outset, it should be noted that while the specific features of the preferred embodiment of the invention adapts especially well to sensing, and thus sorting, of screws (or bolts) with different pitch threads, the overall concepts of gauging and sorting parts set forth herein can be utilized to advantage for other specific applications. For example, in the field of sorting gears, the gears having different numbers of teeth around their periphery, could be tested or gauged with the same principles, as will become evident in the discussion below.

As best shown in FIG. 2, parallel guide rails 15, 16 form a slot or feed path down which the screws S may slide under the influence of gravity. The input end of the guide rails 16 cooperate with the discharge ramp 17 of the bowl 10 and the output end defines a gauging or sorting station, generally designated by the reference numeral 18. When the bowl 10 has vibratory motion applied thereto the screws S will walk up the helix ramp through the exit gate and over the discharge ramp 17 in a properly orientated heads-up position due to the orientating slot 12. As the screws S push forward under the vibrating action they are caught on the aligned guide rails 15, 16 and slide down into juxtaposition with each other as shown in FIG. 2 and ready for the assorting action.

Adjustment screws 20 with locking members 21 are provided to move the rail 15 relative to the rail 16 in order to vary the width of the slot for different size screws (see FIG. 2). The heads of the screws S are held down in the proper position to maintain the screws snug along the feed path by a top guide rail 22 which is adjustable in the up and down direction by similar screw and locking collar combinations 23. The lengthwise adjustment of the top rail 22 to properly position the terminal end of the same at the gauging station 18 is provided by elongated slots 24 and nuts 25 that attach said rail 22 to the support. The apparatus 14 in addition to supporting the rails 15, 16, 22 as just described also supports a gauge assembly 26 that is adjustable by bolt and locking collar combination 27, substantially in the same manner as the other parts just described. The gauge assembly 26 includes an upstanding mounting block 28 and right and left gauge heads 29, 30 supported on the block by suitable screws 29', 30'. After the screws, such as screw $S_1$ at the front of the line moves from the position shown in FIG. 2 to the position in engagement with the gauge heads 29, 30, having arcuate gauge surfaces $t_1$, $t_2$, as shown in FIGS. 1 and 2, the sorting operation is begun.

First, a steady stream of air is supplied from the tube 35 so as to blow downwardly substantially on the top of the rail 15 which has sufficient area to deflect the stream upwardly to lift and gently vibrate or agitate the first screw $S_1$ in line. At the same time this airstream is directed forwardly to feed said screw $S_1$ forward between the fingers (see FIG. 3) and into firm engagement with the gauge heads 29, 30 at the gauging station. This lifting and agitating of the screw $S_1$ and propelling it forward into firm engagement with the gauge head assembly is important in that it assists the screw in properly mating or engaging with the contours of the gauge heads 29, 30. This also alleviates any possibility of an unmachined shoulder at the top of the screw or bolt from hindering the sorting process. That is, as the screw $S_1$ is lifted up, the threads on the lower part of the screw engage the head 29, 30 properly so that the sorting process can continue in an efficient manner.

The heart of the sorting system of the present invention is best shown in FIG. 3, and includes a kicker assembly 40 which has opposed, laterally facing fingers 41, 42 with tapered or chamfered ends engaging opposite sides of the screw or bolt $S_1$ in position to be operated upon. The thus outwardly facing oblique drive surfaces or faces 43, 44 of the kicker finger members 41, 42 thus serve to move the screw $S_1$ forward against the corresponding head 29, 30 as soon as it clears the feed conveyor 14 and has moved to the gauging station 18, as shown in FIGS. 3, 3a. In FIG. 3a, the lead screw $S_1$ is now seated in position along a longitudinal positioning slot 46 formed between the juxtaposed gauge heads 29, 30 by mating edge cutouts. The faces 43, 44 preferably extend at approximately 60° from the longitudinal axis along the feed path between the rails 15, 16 so as to urge the screw $S_1$ laterally away from the feed path F, but also forward to maintain the snug engagement with the slot 46 (see FIG. 3a). The rear faces 43a, 44a of the kicker fingers 41, 42 extend at an angle of approximately 30 degrees to the feed path. These rear faces help in separating and properly gating each following screw $S_2$ as the fingers enter the gauging station, as also shown in FIG. 3a.

Prior to further describing the operation of the kicker assembly 40, as is shown in FIGS. 3b–3c, a description of the remaining structure and in particular the drive mechanism for the kicker assembly 40 should be described. Thus, the fingers 41, 42 are mounted on collars 50, 51 (see FIG. 4) so as to be rotatable with respect to the supporting shaft 52. Mounted on a radial pin 53 extending from the shaft 52 between the collars 50, 51 is a U-shaped drive member 54 adapted to engage opposed drive shoulders 55, 56 at the base of the respective fingers 41, 42 (see FIG. 3).

A pitman 60 is drivingly connected to the shaft 52 and has at its opposite end a closed slot 61 which receives eccentric drive pin 62 stationarily mounted on drive wheel 63 (as shown in FIGS. 2 and 3). The drive wheel 63 is driven by a motor (not shown) through a suitable driving belt 64 in a single rotative direction, as indicated by the arrows 65 in FIG. 3. As a result of the eccentric mounting of the pin 62, the pitman 60 experiences oscillatory motion and thus imparts such motion to the shaft 52. This oscillatory motion is in turn transmitted to the drive member 54 and because of the engagement with the shoulders 55, 56 the fingers 41, 42 oscillate back and forth, as shown by the arrows in FIG. 3. The outward movement of the righthand finger 41 is shown by the dotted line position in FIG. 3 and occurs when the pitman 60 is in the corresponding dotted line (12 O'clock) position, also shown in this Figure.

A key to the effective operation of the kicker members 41, 42 is their interconnection for cooperative movement by a spring 70 (see FIG. 3). The spring 70 is an intermediate force transmitting member when one of the fingers 41, 42 is acting against the screw $S_1$ during the gauging operation. In other words, when the finger 42 is shifted away from the gauging station 18 or to the left, as viewed in FIG. 3a, then the finger 41 is urged toward the station or also to the left as shown by the motion arrows (but only through the spring 70, it being remembered that the collar 50 is rotatably mounted on the shaft 52). In turn, the finger 41 urges the screw $S_1$ being operated upon in the direction of the gauge head 30. In the instance of FIG. 3a, it is clear that the threads of the screw $S_1$ do not mate with the thread-like gauge surface $t_2$ of the head 30, and thus said screw $S_1$ remains at the gauging station 18 locked in the positioning slot 46. Because of the resilient character of the urging force, when the no-go gauge condition is experienced as in this figure, no damage is done to the gauge head or to the threads of the screw.

It will be noted that the fingers 41, 42 are backed up by end edges 15a, 16a of the guide rails 15, 16 (note FIGS. 3a, 3b) and the fingers are not allowed to slip behind the screw $S_1$. Accordingly, as stated before when the no-go gauge condition is present, the spring 70 will continue to stretch affording give to the engagement. The shaft 52 and the drive member 54 reach the limit of oscillation to the left and begin movement back toward the right toward the position of FIG. 3b. The maximum oscillation to the left (FIG. 3a) is reached when the pin 62 is positioned in the six o'clock position and the pitman 60 is in its lowermost position (see FIG. 3).

Proceeding now to conclude the description of the operation of the kicker assembly 40, the pin 62 has moved toward the nine o'clock position and the fingers 41, 42 have shifted until they reach the centered position once again of FIG. 3. The kicker finger 41 now starts moving to the right due to the action of the drive member 54 on the shoulder 55 and it pulls with it through action of the spring 70 the lefthand finger 42 so that the drive face 44 now engages the screw $S_1$. The angle of the face 44 causes the screw $S_1$ to be urged with multi-component force, laterally away from the longitudinal feed path and at the same time against gauge head 29. The force is thus tending to eject the screw $S_1$ to the right laterally of the feed path as it holds the screw snugly against the gauging head 29 for accurate testing.

This time, the threads or outer contour of the screw $S_1$ can be assumed to match or mate with the curved thread-like surface $t_1$ of the gauge head 29 (see FIG. 3c), and accordingly the screw $S_1$ will be kicked to the right and forwardly along the path denoted by the arrow 80 (and the dotted line outline of the screw) to a suitable catch bin, as shown for example in FIGS. 1 and 2, and denoted by the reference numeral $B_1$. As the screw $S_1$ is moved along the gauge head 29, there is a tendency toward rolling action (as shown in FIG. 3c) and then a rapid kicking or ejection of the screw as the energy stored in the spring 70 overcomes the static frictional resistance and the curved surface falls away from the screw. As a consequence of this kicking action and curved head, substantially free lateral movement is experienced and the bin $B_1$ receives the part without being hindered by any obstruction. As before, the back of the finger 42 is guided by the forward edges 15a, 16a of the rails 15, 16 and the back face of the finger 42 serves as a gate for the next screw $S_2$ in line.

As the drive pin 62 on wheel 63 moves back to the three o'clock or home position, the next screw $S_2$ is moved up into the positioning slot 46 by the combined forces of gravity and the airstream from the tube 35 whereupon the process is ready to be repeated. The screw $S_2$ may be assumed to have the proper thread pitch to cooperate with the threaded surface $t_2$ on the gauge head 30, in which instance the finger 41 pulled by the finger 42 as it moves to the left will kick the screw $S_2$ out of the gauging station 18 and into corresponding catch bin $B_2$. It can now be seen that with screws $S_1$, $S_2$ of different threads in the vibratory bowl 10, a sorting of the screws occurs automatically as the driving disc 63 is continuously rotated.

The positioning slot 46 is formed of interchangeable longitudinal cutouts along the edges of the gauge heads 29, 30. The slot 46 substantially delineates the gauging station 18 and serves the function of allowing the screw S to fit freely in position in readiness to be directed laterally in either direction regardless of the thread pitch. The peaks of the screw threads on the screws S rest on the flat surface of the slot 46 and are thus ready to engage in a perfect match with the threads $t_1$, $t_2$ as the case may be.

As shown in FIG. 5, the gauge heads are quarter cylinders with substantially ninety degree sectors at the top and bottom. The gauge surfaces $t_1$, $t_2$ in effect provide four gauge areas $g_1, g_2, g_3, g_4$ that may be used by simply reorientating the head 30 as one area becomes worn. Because of the resilient nature of the mating action as afforded by the spring 70, minimum wearing is experienced; however some wear does occur so that an occasional change in the gauge area is recommended. It will be noted that when the positions $g_2$, $g_4$ are selected for use on the gauge head 30 (and corresponding areas on the gauge head 29), that a transposing of the two heads 29, 30 is required. Of course, a switching of the bins $B_1$, $B_2$ may be necessary if prior separated screws are already in such bins.

In some instances, such as where the system of the present invention is utilized in a manufacturing plant to separate screws collected from the floor along assembly lines, there may be more than two different threads that need to be processed. In such a case, the alternative arrangement of FIG. 3d (or equivalent structure) is necessary in order to release those screws which do not have threads matching with either gauge head 29, 30. The preferred embodiment illustrated herein comprises a movable head support 29a for the gauge head 29. At the end of each oscillatory cycle of the mechanism the two gauge heads 29, 30 are automatically separated to allow the odd screw $S_r$ to be discharged through a third path, that is, a path separate from the screws that have been successfully gauged and classified. To allow separation, the support 29a rides in a dovetail guide slot 90 in the main upstanding support 28. The support 29a is operative to effect a shifting so as to present an opening between the two heads along the positioning slot 46, preferably with half the slot formed on each head (as shown). When this is done, the screw to be rejected, $S_r$, (see dotted line outline in FIG. 3a) is allowed to fall by gravity to a suitable inclined chute 92 below where such screw can be separately deposited in another bin (not shown). The forward or receiving portion of the bin is open to permit the screw $S_r$ to drop therein and the portion extending over the bins $B_1$, $B_2$ may, if necessary, be covered to prevent inadvertent catching of one of the screws intended for those bins.

The mechanism for releasing the screw $S_r$ is conveniently controlled through a control circuit C, shown in FIG. 6. A control cam 100 mounted on the continuously rotating drive shaft 52 (see FIG. 2, also) has a single raised operator 101 that serves to close normally open gauge head shift microswitch 102 once during each cycle. In particular, the microswitch 102 is closed when the drive pin 62 is substantially located in the 12 o'clock position (cf. FIGS. 3 and 6). In this case, the circuit is completed through leads 103, 104 so that voltage source 105 actuates the combination counter and solenoid valve 106. After a selected number of cycles of the kicker assembly 40, air is admitted through the line 107 to drive the cylinder 91 to shift the gauge head 29 to the open position. As will be realized, this opening occurs when the fingers 41, 42 are in the position substantially shown in FIG. 3d and the action lasts only long enough to release the screw $S_r$; the gauge head 29 being shifted back immediately in readiness to receive the next screw in turn when the home position is next reached (as shown in FIG. 3). In other words, when the feeler for the microswitch 102 moves off of the operator 101, the cylinder 91 (if in a counted operative cycle) operates its piston through line 107a to close the gauge head 29 and the next sorting cycle is ready to be performed.

The reason for supplying a counter in the circuit C is to assure that each of the screws S has had sufficient opportunity to be matched with the heads 29, 30 and thus properly sorted. In other words, it is desirable in some cases to operate the kicker fingers 41, 42 several times against the screws S in both directions until the proper alignment of the screw threads with the contours $t_1$, $t_2$ of the heads 29, 30 is accomplished. The agitating movement of the airstream from tube 35 minimizes the number of cycles normally required so that in most instances only one or two cycles are required; however, with difficult thread contours (most usually, large pitch screws) as many as five to ten cycles can be efficiently used.

A switch 104a has been provided to disable the circuit C in the event that only two different screws are known to be present in the particular batch being processed. In this case, the screw $S_1$ holds the next in line screw $S_2$ back until the former has been sorted whether it be on the first or any other subsequent cycle. Then on the next pass of the kicker assembly 40 through home position, the back of the kicker fingers 41, 42 release or gate the screw $S_2$ to the gauging station whereupon the process is repeated.

In the instance wherein the screw $S_1$ mates with the gauge head 30 on the first pass of the kicker assembly 40, it would be possible for the next screw $S_2$ to enter at mid-cycle. However, this is undesirable when more than two species of screws are being sorted and thus a solenoid 110 is positioned adjacent the feed path so that its armature 110a can intermittently prevent such an occurrence (see FIG. 3d). Such a solenoid 110 may be operated from the same control cam 100 by positioning a normally open check-gate microswitch 111 at the nine o'clock position as shown in FIG. 6. Immediately before the fingers 41, 42 pass the intermediate home position the first time during each cycle, the armature 110a is extended to the dotted line position to capture the screw $S_2$. After the open space between the fingers (home position) passes the armature retracts and the rear face of the fingers serve the holding function so that it may immediately enter the gauging station if the other conditions of the system require it.

In light of the foregoing discussion and description of the apparatus and method of the present invention, it should now be clear that an advance in the art has been made. For the first time, the difference between the threads of two screws of the same size may be easily distinguished in an automatic fashion so that mixed batches of screws may be sorted to allow their use on an economic basis. The lateral movement of the screws from a gauging station positioned along a feed path gives a rapid and otherwise efficient assorting operation. The apparatus may be quickly adapted for different size screws and for reading different threads by merely adjusting the parts and substituting appropriate gauge heads 29, 30. When more than two different threads are to be distinguished from the supply in the bowl 10, the screws $S_r$ to be rejected may be segregated and then processed further, such as through the same machine with an appropriate change in the heads 29, 30 to two additional thread standards.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

I claim:

1. An apparatus for sorting parts having distinctive outer contours comprising conveyor means for feeding said parts in seriatim along a feed path to a gauging station, first and second gauge means having different reference contours positioned laterally of said station, means for relatively urging the part at said gauging station laterally with respect to said station in a first direction and then in a second direction, said urging means causing said part to move with respect to one of said gauge means in a go condition when the contours of said part and the selected gauge means match, and first and second receiving means for the part when matching of the contour of said part occurs respectively with said first and second gauge means, said first gauge means being in a no-go condition to maintain said part at said gauging station when there is no match therewith whereby said part may be then gauged at said second gauge means.

2. The apparatus of claim 1 wherein said urging means comprises an oscillatable kicker assembly having opposed fingers alternately movable across said gauging station for moving said part.

3. The apparatus of claim 2 wherein said fingers are mounted on a single oscillating shaft, drive means on said shaft for imparting the oscillating movement to said fingers and means for oscillating said shaft.

4. The apparatus of claim 2 wherein said kicker assembly includes resilient means interconnecting said fingers for imparting the oscillating movement from the fingers moving away from said station to the one moving toward and across said station.

5. The apparatus of claim 3 wherein said fingers are carried by said shaft so as to be rotatable relative thereto, a drive shoulder on each finger, spring means positioned between said fingers to urge said shoulders into engagement with said drive member, the movement of each finger across said gauging station being imparted by the spring from motion of the opposite finger away from the gauging station in response to movement of said drive member, whereby kicking action is resilient such that in the no-go condition no damage to the part and the gauge means is experienced.

6. The apparatus of claim 2 wherein said conveyor includes inclined parallel spaced guide rails forming said feed path for feeding of the parts to said gauging station by gravity, said rails terminating with end guide faces adjacent said station, said fingers being held in engagement with said parts and said parts in turn against said gauge means by said guide faces.

7. The apparatus of claim 6 wherein the drive ends of said fingers are provided with a chamfer, the drive surface of said chamfer serving to further urge said part toward said gauge means.

8. The apparatus of claim 1 wherein said parts are screws provided with threads of different pitch, said first and second gauge means including respective gauge heads each having thread-like contours corresponding to the selected threads to be sorted.

9. The apparatus of claim 8 wherein said gauge heads are curved and extend away from the gauging station, said urging means causing said screws to move along said gauge heads and free of the same for dropping by gravity clear of said gauging station into the corresponding receiving means.

10. The apparatus of claim 9 wherein said curved heads extend in the same direction as the movement of screws along said free path to cause said screws to be projected forwardly into said receiving means.

11. The apparatus of claim 1 wherein said gauge means includes cooperating gauge heads having a longitudinal cutout edge extending along the gauging station, the cooperating cutouts serving to form a positioning slot at said gauging station to accommodate one side of said part, said positioning slot being substantially the depth of the contours on said part to allow easy mating relationship with the adjacent corresponding reference contour of the gauge head.

12. The apparatus of claim 11 wherein said gauge heads are quarter cylinders defining substantially 90 degree sectors at the top and bottom with said reference contour extending around the arcuate gauge surface, said heads being positionable at the gauging station with any one of the four corners of said surface to perform the gauging operation.

13. The apparatus of claim 1 wherein is further provided means for releasing said part from said gauging station independently of said gauge means whereby when there is a no-go condition and no match with either gauge means after a complete gauging cycle said part may be discharged for further processing.

14. The apparatus of claim 13 wherein is further provided means for retaining the next part in line along the feed path and releasing the same at the end of each gauging cycle.

15. The apparatus of claim 1 wherein is further provided inclined parallel spaced guide rails for feeding of said parts to said gauging station by gravity, an upper guide rail extending along said feed path and extending to said gauging station for limiting the upward movement of said parts and pneumatic means for producing a stream of air to agitate each part in turn for encouraging alignment of the part at the gauging station with the gauge means.

16. The apparatus of claim 15 wherein said pneumatic means includes a tube having an exit orifice directed downwardly toward said conveyor means, said conveyor means having sufficient surface area adjacent the gauging station to deflect the air stream and redirect the same upwardly to thereby also lift the part being gauged.

17. The method of sorting parts having distinctive outer contours comprising the steps of feeding the parts along a feed path to a gauging station, laterally relatively urging each part with respect to the gauging station in a first direction and then in a second direction, relatively moving said parts with respect to said gauge heads having reference contours corresponding to the contours of the parts in said first direction when a match and thus a go condition occurs, each part being relatively moved in the second direction if a no-go condition exists in the first direction, and collecting said parts relatively moved in said first and second directions to separate collection points.

18. The method of claim 17 wherein is provided the additional step of removing the part from the gauging station in the event that a no-go condition exists in both said first and second directions.

19. The method of claim 17 wherein the movement is accomplished by moving of said parts laterally of the feed path.

20. The method of claim 17 wherein the parts are screws having different pitch threads.

* * * * *